Figure 1:
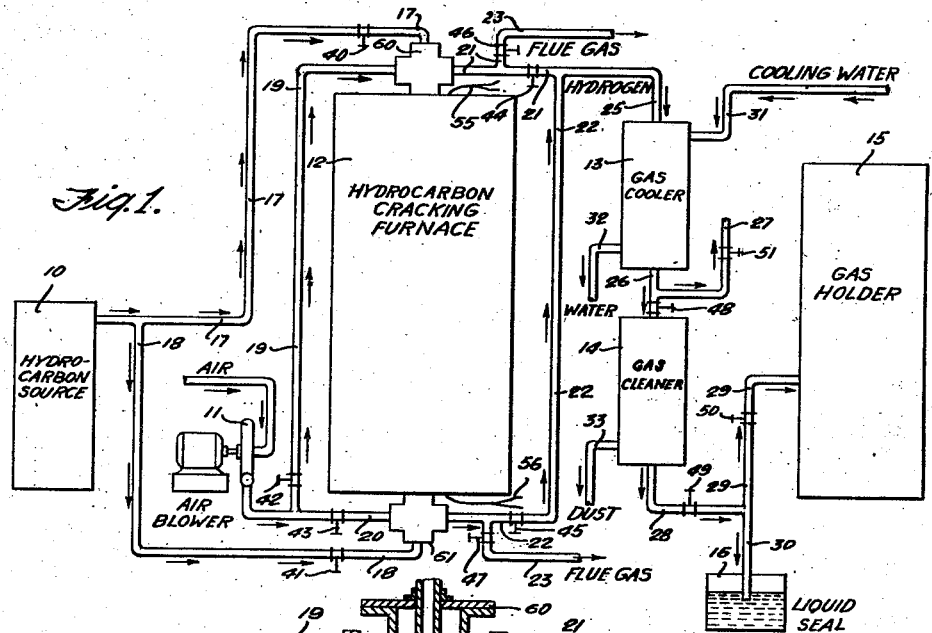

Feb. 23, 1937.                G. D. BAGLEY ET AL                2,071,721
                PROCESS AND APPARATUS FOR PRODUCING HYDROGEN
                                Filed June 22, 1933

INVENTORS
GLEN D. BAGLEY
HENDRIK W. B. DEW. ERASMUS
BY
ATTORNEY

Patented Feb. 23, 1937

2,071,721

UNITED STATES PATENT OFFICE 2,071,721

PROCESS AND APPARATUS FOR PRODUCING HYDROGEN

Glen D. Bagley, Great Neck, and Hendrik W. B. de W. Erasmus, Long Island City, N. Y., assignors, by mesne assignments, to Union Carbide and Carbon Corporation, a corporation of New York Application June 22, 1933, Serial No. 677,024

4 Claims. (Serial No. 23—212)

The invention relates to the production of hydrogen, referring more specifically to new and useful apparatus for producing hydrogen from hydrocarbons by thermally decomposing the latter to hydrogen and carbon.

Various types of apparatus for cracking hydrocarbons by pyrolysis to hydrogen and carbon have been proposed. In general, the principle has been to store heat in a refractory mass and then to use this stored heat to crack the hydrocarbons. The majority of these proposals have embodied more or less successful attempts to prevent the deposition of carbon on the refractory mass, and to remove the carbon as a product of the proposed process. If the carbon is removed from the refractory, the heat consumed during the cracking operation must be replaced by burning fuel in the refractory mass, or by supplying heat externally. Typical proposals of this nature are contained in Patents 1,265,043; 1,276,487; and 1,551,235 to Brownlee and Uhlinger; Patent 1,276,385 to McCourt and Ellis, and Patent 1,107,926 to A. R. Frank.

Several proposals have been made to retain within the refractory mass most of the carbon obtained pyrolytically from the hydrocarbons, and to replace the heat consumed by the cracking operation by subsequently burning the retained carbon. An example of such proposals is to be found in Patent 179,369 to M. H. Strong.

When the only product desired is hydrogen, proposals of the latter nature are the more attractive; but many practical difficulties must be overcome if the proposals are to be reduced to commercial practice. For instance, processes and apparatus heretofore proposed are not well adapted to the control or variation in the rate of production of hydrogen, to the control of the purity of hydrogen produced, to the maintenance of suitable temperatures and temperature gradients within the refractory mass, or to automatic operation.

It is an object of the invention to provide apparatus for producing by the pyrolysis of hydrocarbons hydrogen substantially free from oxygen, carbon dioxide, and unsaturated hydrocarbons, and containing only small amounts of nitrogen, carbon monoxide, and saturated hydrocarbons.

Another object of the invention is to provide a method and means for attaining and maintaining suitable temperatures and a suitable temperature gradient for cracking hydrocarbons pyrolytically.

These and other objects of the invention are attained in the apparatus described herein and shown in the accompanying drawing, in which—

Figure 2:
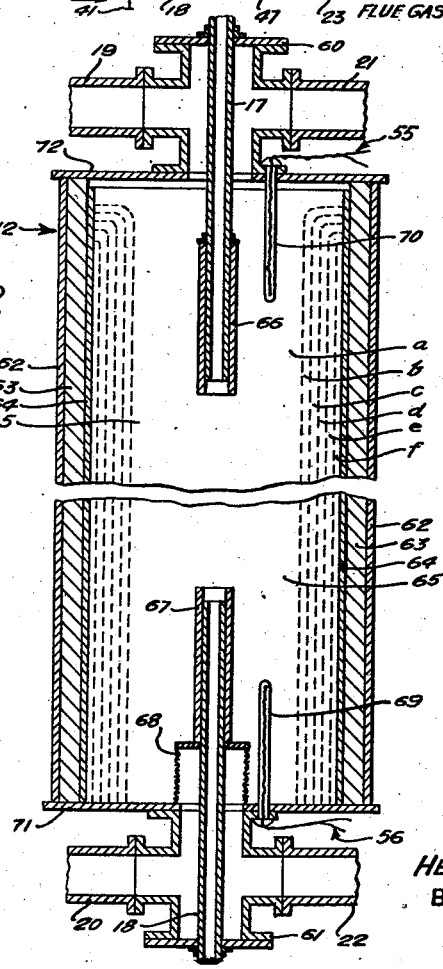

Figure 1 is a diagrammatic representation of the apparatus of the invention, indicating suitable apparatus parts and showing suitable connections and control valves; and Figure 2 is a vertical cross-section of a suitable cracking furnace according to the invention, showing details of construction.

The general process employed in the apparatus shown in Figures 1 and 2 comprises the steps of passing hydrocarbon gases or vapors over refractory material which is at a temperature sufficiently high to effect rapid and complete breakdown of the hydrocarbon into carbon and hydrogen; depositing substantially all of the carbon so obtained on the surface of the refractory and retaining this carbon within the mass of refractory; removing, cooling and cleaning the hydrogen; then shutting off the supply of hydrocarbons and burning out the deposited carbon with preheated air whereby to reheat the refractory material to cracking temperatures; and repeating the cracking and reheating stages as a quasi-continuous process.

Preferred apparatus for carrying out this process is shown diagrammatically in Figure 1. A source 10 of hydrocarbon gases or vapors, for example, natural gas or natural gas fractions, vaporized petroleum fractions, or the like, at a pressure sufficient to cause the desired flow of gas through the apparatus, is conducted through a pipe 18 and a valve 41 to a bottom connection 61, or through a pipe 17 and a control valve 40 to a top connection 60, of a cracking furnace 12 described in detail hereinbelow with reference to Figure 2. Air, raised to the desired pressure by a blower or pump 11, is conducted through a pipe 20 and a control valve 43 to the bottom connection 61, or through a pipe 19 and a control valve 42 to the top connection 60, of the cracking furnace 12. Flue gases from the combustion stages may be removed from the top of the of the process through the connection 60, a valve 46, furnace and a flue 23, or from the bottom of the furnace through the connection 61, a valve 47, and the flue 23. The hydrogen may be led from the top of the furnace through the connection 60, a valve 44 and a pipe 21; or from the bottom of the furnace through the connection 61, a valve 45, and a pipe 22. Hydrogen from either of the pipes 21 or 22 may be led through a pipe 25 into a gas cooler 13 suitably provided with a cooling water inlet 31 and a cooling water outlet 32. From the gas cooler 13, the cooled hydrogen may be led through a pipe 26 and a valve 48 into a gas cleaner 14, which may be a bag filter, cyclone separator, centrifugal dust separator, or an equivalent cleaning device. Carbon dust is removed by the gas cleaner 14, and may be discharged from the system through a discharge pipe 33. The cleaned hydrogen may be led from the gas cleaner 14 through a pipe 28, control valves 49 and 50, and a pipe 29, into a gas holder 15 or directly to the point where the hydrogen is to be utilized. A liquid safety-seal 16 may be inserted between the gas cleaner 14 and the gas holder 15. A flue connection 27 should be connected through a control valve 51 to the hydrogen line, suitably at a point in the pipe 26 following the gas cooler 13.

Referring to Figure 2, the outer portions of the furnace 12 suitably comprise a substantially gastight outer shell 62 provided with a top plate 72 and a bottom plate 71, which may be constructed from ordinary structural steel and which form an enclosing chamber. Concentrically disposed within the outer shell 62, and spaced therefrom, is an inner shell 64. The inner shell 64 is preferably constructed of a heat-resisting steel, and when it is so constructed it should be attached to only one of the plates 71 or 72, so as to allow for the difference between the coefficients of expansion of the metals of the shells 62 and 24. Between the inner shell 64 and the outer shell 62, there may be placed suitable insulating material, for example, precipitated magnesia or diatomaceous earth. Within the inner shell 64 is placed refractory material 65 in the form of discrete pieces. Under some conditions it is possible to dispense entirely with the outer shell 62, and if this is done, the inner shell 64 should be attached to both of the plates 71 and 72 so as to form a substantially gas-tight chamber.

The refractory material 65 is preferably one which has a very high softening temperature, well above 2000° C., which contains no metals or compounds which volatilize to a great extent around 2000° C., which contains no large percentage of metals tending to form readily reducible oxides, which does not tend to spall seriously, and which is not prohibitively expensive. A material which meets these requirements admirably is substantially iron-free fused magnesia which has been fused in the electric furnace. Fused pure alumina will also be suitable under some conditions. Lime, silicon carbide, and fused zirconia are other refractory materials which may be used under some circumstances; but, in general, fused magnesia is preferred.

It is extremely important that the refractory material 65 have the above indicated properties. The temperatures attained during the operation of the furnace may be from 1600° C. to about 2300° C., and even higher temperatures may be obtained at times. The refractory material must not seriously spall, soften, or sinter at these high temperatures, lest the furnace become blocked and choked. Further, the refractory material should preferably contain less than about 0.1% of iron or other metals having easily reduced oxides, because such metals are oxidized during the carbon burning period, and then reduced during the cracking period, and the hydrogen thus becomes contaminated with relatively large amounts of carbon monoxide.

The refractory material 65 is preferably in the form of powder, granules, and lumps, and when used in this form should be carefully separated into portions each containing approximately uniformly sized pieces, the largest pieces being placed as a random-packed core $a$ along the central axis of the furnace, and successively smaller sizes forming concentric layers or rings, for example $b$, $c$, $d$, and $e$, between the core $a$ and an outer ring $f$ containing the finest material. The size of material in each ring is preferably chosen so that it will not tend to pass into the interstices between the pieces of material of the next larger size. The coarsest material may suitably be 2 to 6 inches in diameter, and the finest material may be dust.

The separation of the refractory material 65 into graduated sizes decreases the bulk density of the filling; decreases the total weight of the filling to be supported by the furnace; utilizes the superior heat insulating qualities of the smaller sizes; and thereby affords better protection to shell 64; decreases channelling and slippage of uncracked gas along the inner shell 64 out of contact with the highly heated central core $a$, and also more completely cracks the gas in the cooler outer portions by decreasing the rate of flow of gas in those portions; increases the interstitial carbon-storage capacity of the central core $a$; eliminates the tendency for the small particles to bond the larger particles together by a sintering action; and allows settling of the filling material without the formation of arches or channels, thus tending to prevent the propagation of severe explosion waves within the furnace even if explosive mixtures of gas and air are present. The interstices of the core $a$ of large particles serve as a main passage for the gases passing through the furnace, and the method of placing the refractory tends to guide the main stream of gases into the hot central portions of the furnace.

The refractory filling may be put in place by using a short mold (not shown) made up of concentric sheet metal pipes. The mold may be placed on the bottom plate 71, the various sizes of refractory packed within the correct annular space, the mold then pulled up, and the operation repeated until the furnace is filled.

It is advantageous to "fold over" the successively coarser layers near the top of the furnace, as indicated by the dotted lines in Figure 2, so as to keep the finer material from being blown out of the furnace.

Referring further to the parts of the furnace shown in Figure 2, gas connections to the furnace may comprise suitably a bottom cross fitting 61 and a top cross fitting 60, each preferably placed concentrically with the axis of the furnace. The opening of the bottom cross 61 into the furnace may be protected by a screen 68. A similar screen (not shown) may be used at the top of the furnace, but will usually not be necessary. Gas inducting pipes 17 and 18 may be provided for introducing hydrocarbons or other fuel into the furnace, and these pipes should extend well into the furnace. The pipes 17 and 18 may be protected from high temperatures by refractory sleeves 66 and 67, respectively. Under some circumstances it will be desirable to provide water cooling means (not shown) to cool the sleeves 66 and 67. More than one gas inducting pipe may be used at each end of the furnace if desired. Pyrometers, suitably thermocouples 55 and 56, may be inserted at the ends of the furnace.

When the cold furnace is to be heated, the valves 40, 42, 44, 45, and 47 are closed and the valves 41, 43, and 46 are opened. Hydrocarbons enter the furnace through the pipe 18, and air enters the furnace through the pipe 20 and the screen 68. The air and hydrocarbons mix above the end of the pipe 18, and may be ignited by an electric spark or by any other suitable means. The mixture burns on the surface of the particles of refractory material 65, heating the same, and the combustion products pass out of the furnace through the pipe 21 to the flue 23. When the top thermocouple 55 reaches a desired predetermined temperature, suitably about 400° C. to 500° C., the heating blast is reversed.

By using this method of heating, with frequent reversals of blast and with the use of preheated air, a very high temperature is rapidly attained in the center of the furnace, yet the ends of the furnace remain comparatively cool.

By premixing a part or all of the air and fuel, and burning the mixture in the furnace, it is possible to control to some extent the maximum temperature attainable in the furnace, and this expedient may sometimes be used to advantage.

The progressively steeper temperature gradients through the furnace may be used to indicate when the furnace is up to temperature. Whenever the heating in one direction brings the outlet thermocouple up to a predetermined temperature, the direction of heating is reversed. As the furnace gets hotter the frequency of reversal is increased, and the temperatures of the outlet and inlet thermocouples just prior to reversal become more nearly equal. Either the frequency of reversal or the difference between the temperatures of the outlet and inlet thermocouples may be used as a criterion of the sufficiency of the length of the heating stage. A few trials will indicate the optimum temperature to be attained in the outlet thermocouple, and the optimum length of time of heating determinable by the above criteria, for any given furnace design and rate of flow of hydrocarbons.

An alternative method of control consists in using one thermocouple, at the bottom of the furnace, and in water-cooling the top of the furnace. A few trials will determine the proper frequency of reversal.

After the furnace is up to cracking temperatures, which usually will be approximately 2000° C. to 2200° C. in the hottest portions of the furnace, the heating stage is stopped by closing the valves 40, 41, 42, 43, 45, 46 and 47; and a purging stage is begun by closing the valve 48 and opening the valves 51, 44, and 41. Hydrocarbons are passed through the furnace until the gas issuing through the exhaust pipe 27 is hydrogen of a purity which indicates that purging of the interstices of the refractory material 65 is satisfactorily complete.

When the purging stage is completed, the valve 48 is opened and the valve 51 is closed, whereupon the hydrogen from the cracked hydrocarbons passes into the holder 15. The carbon cracked from the hydrocarbon is deposited in the interstices of the refractory material 65. The cracking stage is continued either until the deposited carbon has so choked the furnace that the drop of pressure through the furnace reaches an allowable maximum, or until the temperature of the cracking zone has fallen to a point below which cracking to hydrogen and carbon is too incomplete, such temperatures being usually about 1500° C.

At the end of the cracking stage, valves 41, 44, and 48 are closed, and valves 46 and 43 are opened, so that a blast of preheated air burns carbon as fuel in the center of the furnace, and the combustion products are led to the flue. Reversals of blast are used in the carbon burning stage as in the previously described heating stage, but no fuel need be used in the carbon burning stage provided the furnace is constructed according to the present invention. After the furnace has been brought up to temperature the first time, the process ordinarily is self-sustaining, in that the carbon deposited during the cracking stage is more than sufficient to supply the necessary heat to reheat the refractory. If the rate of flow of hydrocarbons is too slow, some additional fuel may have to be used during the reheating period.

While in the above description of the cracking stage, the hydrocarbon gas for cracking was introduced through the pipe 18, it may be introduced through the pipe 20 and the screen 68. It is ordinarily necessary to use the pipe 18 only when the cold furnace is being brought up to heat by burning gas and air. However, if the hydrocarbons are introduced through the screen 68, it will usually be found necessary to water-cool the refractory sleeve 67 during the carbon burning period, because the burning of carbon in the lower part of the furnace will greatly raise the temperature of that part.

It may sometimes be desired to recycle during the cracking period some of the hydrogen product, or a portion of the hydrogen product after further treatment, for example, an impure fraction resulting from a separation or purification of the hydrogen product. In such a case, it will usually be advantageous to introduce the hydrocarbon through the pipe 18, and the hydrogen through the screen 68.

If it is noted that the zone of highest temperature within refractory material 65 has moved away from the center of the furnace and is approaching one end of the furnace, the hydrocarbon to be cracked may be introduced into the opposite end of the furnace until the hottest portion is again approximately in the center. For example, after the cracking gases have been introduced at the bottom of the furnace for several days, it may be found desirable to introduce the cracking gases at the top of the furnace for several days. More frequent reversals of flow of cracking gases may of course be used.

The air blower 11, the gas cooler 13, the gas cleaner 14, the gas holder, an the liquid seal 16, may each be of conventional or known design.

By the use of the apparatus and process of the invention, hydrogen of good commercial purity may be produced. By way of illustration, the following table of data gives analyses of the gas produced during a representative cracking operation. Higher purities may be and have been obtained. In general, the use of purer fused magnesia and of longer periods of purging result in a purer product.

| Gas sample number | 1 | 2 | 3 | 4 |
|---|---|---|---|---|
| Time after starting cracking, minutes | 2 | 6 | 14 | 20 |
| Analysis of gas: | Per- cent | Per- cent | Per- cent | Per- cent |
| Oxygen | 0.0 | 0.0 | 0.0 | 0.0 |
| Carbon dioxide | 0.4 | 0.2 | 0.0 | 0.0 |
| Unsaturated hydrocarbons | 0.1 | 0.1 | 0.0 | 0.0 |
| Saturated hydrocarbons | 0.5 | 0.4 | 0.6 | 0.6 |
| Carbon monoxide | 5.2 | 4.4 | 4.0 | 3.1 |
| Nitrogen | 8.0 | 5.7 | 3.3 | 2.5 |
| Hydrogen | 85.8 | 89.2 | 92.1 | 93.8 |

It will be seen that by using a fairly long flushing period, preferably at a low rate of flow of hydrocarbons, hydrogen of very good purity may readily be obtained.

The apparatus of the invention is well adapted to automatic or semi-automatic control. By installing electrically controlled valves and timing mechanisms of standard design, automatic control may be successfully attained.

Major fields of use for the hydrogen produced according to the invention include the bright annealing of metals and alloys, and the hydrogenation of coal, oils, and fats. Where necessary or desirable, the hydrogen may be further purified before use.

We claim:

1. Process for producing, by pyrolysis of hydrocarbons, hydrogen substantially free from oxygen, carbon dioxide and unsaturated hydrocarbons and containing only small amounts of nitrogen, carbon monoxide and saturated hydrocarbons, which process comprises in cyclical sequence the steps of introducing a stream of hydrocarbon gas well within and passing it longitudinally through a substantially cylindrical heterogeneous mass of hot crushed refractory material arranged in successive closely sized and substantially concentric layers providing a relatively porous longitudinal central core surrounded by successive layers of decreasing porosity whereby said stream of gas is distributed throughout the cross section of said refractory mass in such manner that the time of exposure of gas passing in contact with colder outer portions of the mass is automatically regulated to give a degree of cracking efficiency similar to that obtained with the portions of the gas passing at higher velocity through hotter and more central parts of the mass, whereby uniformly high cracking efficiency throughout the refractory mass is assured; continuing to pass said stream of hydrocarbon gas through said refractory mass and collecting the hydrogen product until the temperature at the exit end of said mass has decreased to a predetermined temperature and thereupon stopping said gas stream; passing a blast of air through the refractory mass alternately from opposite ends of the chamber whereby carbon deposited during the gas run is burned and the major part of the heat generated is absorbed in the central portions of the refractory mass whereby its temperature is again raised and the desired axial and radial temperature gradient is attained; continuing said blast of air until the temperature of a given portion of the refractory mass has increased to a predetermined temperature; and thereupon stopping said air blast and beginning another cycle of operation with the first-mentioned step.

2. Automatic cyclic process for producing hydrogen by pyrolysis of hydrocarbon gases which comprises in repeated sequence introducing a hydrocarbon gas well within and passing it longitudinally through a reaction chamber filled with a heterogeneous mass of hot crushed fused magnesia of high purity arranged in successive closely and differently sized and concentrically disposed layers providing a relatively porous longitudinal central core surrounded by successive layers of smaller sized refractory, each successive layer of refractory consisting of pieces larger than the interstices of the next preceding layer, whereby the stream of gas is automatically distributed throughout the cross section of said refractory mass in such manner that the time of exposure of gas passing in contact with colder outer portions of the mass is sufficient to ensure a cracking efficiency similar to that obtained in the hottest portions of said core; continuing to pass said stream of gas through the chamber until a pyrometer embedded in a suitable portion of the mass automatically shuts off the gas stream and opens valves admitting a blast of air; automatically and periodically reversing said blast of air by means of a time control mechanism, whereby a steep temperature gradient is attained axially and radially from the central core toward the outside of the mass, and overheating of the ends of the apparatus is avoided; and repeating the foregoing steps in a cyclic manner.

3. Apparatus for the production of hydrogen by pyrolysis of hydrocarbon gases in a cyclic process, said apparatus comprising a gas-tight substantially cylindrical metal shell enclosing a reaction chamber filled with a heterogeneous mass of refractory material consisting of a plurality of portions of refractory material forming concentric shells extending longitudinally of the reaction chamber, each portion consisting of discrete pieces substantially uniform in size but different in size from the pieces in the other portions, the largest sized portion of refractory providing a relatively porous core, each successive outer layer or portion of refractory being composed of smaller sized pieces; gas inducting pipes extending into the central core of the refractory mass from either end of said chamber and terminating at a substantial distance from the respective ends of the chamber; means for introducing gas through either of said induction pipes; means for independently introducing a blast of air at either end of said chamber at a point nearer to the respective ends thereof than the termini of said gas induction pipes; and means for removing flue gas and hydrogen from either end of said chamber.

4. A furnace for producing hydrogen by pyrolysis of hydrocarbon gases which comprises an outer metal shell forming a substantially gas-tight enclosing chamber; a heat resistant metal shell within the outer shell and spaced therefrom; heat insulating material between the inner and outer shells; a mass of refractory material within the chamber consisting of a plurality of portions of refractory material, each portion consisting of discrete pieces substantially uniform in size but different in size from the pieces in the other portions, the portion containing the largest pieces forming a main passage for gases through the furnace, and the remaining portions forming concentric layers about the core, each layer consisting of pieces smaller than those in the portion which it next surrounds, and the pieces in each layer being too large to pass into the interstices of the layer of next larger pieces; at least one gas inducting pipe at each end of the said passage, each pipe extending a substantial distance along the passage and into the mass; means at each extremity of the passage for introducing air into the mass, one of said gas inducting pipes comprising a part of said means; means at each extremity of the passage for removing combustion gases from the mass; means for introducing hydrocarbons into the mass; and means for removing hydrogen from the furnace.

GLEN D. BAGLEY.
HENDRIK W. B. DE W. ERASMUS.